Patented Aug. 28, 1945

2,383,602

UNITED STATES PATENT OFFICE 2,383,602

PROCESS FOR TREATMENT OF FATTY GLYCERIDES

Gerald Inman Keim, Newark, and John Ross, Ramsey, N. J., assignors to Colgate-Palmolive-Peet Company, Jersey City, N. J., a corporation of Delaware No Drawing. Application March 4, 1943, Serial No. 478,008

17 Claims. (Cl. 260—410.9)

The present invention relates to a process for treating fatty materials and, more particularly, to an improved process for effectively recovering excess alcohol from alkaline alcoholysis reaction mixtures.

A fat or fatty oil can be reacted with an alcohol in the presence of a small amount of an alcoholysis catalyst to produce esters of the fatty acid and glycerine. By the processes employed by the prior art, the glycerine was not readily separable from the fatty esters. When, as after alcoholysis with methanol, a two-phase reaction mixture resulted, the glycerine layer contained dissolved methyl alcohol which kept some of the methyl esters in solution in the lower layer, and the upper layer of methyl esters and alcohol contained some dissolved glycerine. This required separate working up of the two layers. When using ethyl or higher alcohols for the alcoholysis, separation of the glycerine was not immediately obtainable, and the excess alcohol and catalyst were washed out with water to effect the separation, thereby diluting the glycerine and necessitating the dehydration of recovered unreacted alcohol before reuse. It was recently discovered that improved settling conditions may be obtained, as disclosed by Walter Russell Trent in his United States patent application Serial No. 462,370 (filed October 17, 1942), by removing excess unreacted alcohol by distillation in substantially anhydrous state before separating the glycerine and the esters. Since the distillation residue contains substantially no alcohol as a common solvent for the glycerine and the alkyl esters, a separation usually results.

It is a shortcoming of even this improved method, however, that as in prior art methods, when employing an alkaline alcoholysis catalyst, at least a portion of the alkaline catalyst reacts with the fatty esters to form soap. It has now been found that the presence of soap in the reaction mixture promotes miscibility and frequently interferes with the separation of the ester and glycerine layers, especially at higher temperatures suitable for efficient and effective volatilization of substantially all excess alcohol in a short time.

It is an object of the present invention to provide an improved process for reacting fats and fatty oils with an alcohol in the presence of an alkaline alcoholysis catalyst with rapid and effective removal of excess alcohol, while still obtaining sharply separable layers of fatty esters and glycerine.

Another object of this invention is the provision of a process for reacting fatty glycerides with an alcohol in the presence of an alkaline catalyst and heating the reaction mixture to a temperature at which unreacted alcohol is rapidly and effectively removed.

Other objects and advantages of the invention will be apparent from the following description.

According to the present invention, a fatty glyceride is contacted with an alcohol, preferably in large excess, in the presence of a small amount of an alkaline alcoholysis catalyst for a relatively short time. The mixture may be kept at room temperature or may be heated during a few minutes' period to obtain rapid alcoholysis. The reaction may be brought to completion in a single contacting of the materials, or, as disclosed by Joseph Henry Percy in United States patent application Serial No. 462,369 (filed October 17, 1942), the glycerides may be partially esterified with the alcohol in a first treatment to form a pool of partially reacted material containing mono-glycerides and di-glycerides, so that the reaction mixture is substantially homogeneous. Additional reactants, such as alcohol and alcoholysis catalyst either alone or with the fatty oil, can be added to this homogeneous mixture without immediately affecting the homogeneity, and the reaction may then be brought toward completion.

As the reaction is brought to completion, whether in a single contacting or in a series of steps, the glycerine formed tends to separate as a lower layer. The temperature is increased to vaporize excess alcohol at a temperature above the temperature at which the resulting alcohol-free mixture becomes substantially homogeneous in the presence of soap formed. However, the volatilization of the alcohol is preferably carried out at a temperature insufficient for any substantial reversal of the reaction with the alcohol removed. After removal of the alcohol, the residue is subjected to cooling conditions and is allowed to settle; glycerine separates out as a lower layer and is withdrawn, and the upper layer containing alkyl esters, and in some cases incompletely reacted glycerides, is also removed for further processing. The upper layer comprising esterified material may be treated in any of several ways, as has been pointed out in United States application Serial No. 462,370.

It is a feature of the present invention that the volatilization of the excess alcohol may thus be carried out at a temperature above the temperature at which the resulting alcohol-free mixture becomes substantially homogeneous, since according to this invention, the temperature of homogeneity has been found to be substantially below the temperature of substantial reversal of the reaction in the absence of alcohol. The resulting alkyl esters and glycerine can then be separated at a temperature below the temperature of substantial homogeneity of the mixture in the presence of soap, but above the temperature of gelatinization of any soap present. If desired, the residue after removal of the alcohol may be acidified with an acid stronger than the fatty acids of the glycerides, as disclosed by Walter Russell Trent in United States patent application Serial No. 474,188 (filed January 30, 1943), preferably with a dilute mineral acid, and may thereafter be allowed to settle.

In a preferred procedure, the fatty glyceride is passed together with the alcohol and an alkaline catalyst through a contactor coil, and the mixture is run, under reduced pressure if desired, over a bank of steam coils which are heated to an elevated temperature above the temperature of homogeneity of the resulting mixture due to any soap formed by saponification of part of the esters by the catalyst and below the temperature of substantial reversal of the reaction. The alcohol is volatilized, and the remainder of the mixture is cooled and run into a settling chamber, from which a lower glycerine layer can be withdrawn.

In an alternative procedure, the mixture may be contacted under superatmospheric pressure at an elevated temperature for a short period, say about ten minutes or less, and then released into a lower pressure zone to flash off excess alcohol. The remainder of the mixture is cooled below the temperature of substantial homogeneity of the mixture and is passed to the settling chamber. Although high temperatures may be advantageously employed in the flashing for substantially completely volatilization of the alcohol, the operation is preferably controlled so that the end temperature is below the temperature of substantial reversal of the reaction upon removal of the alcohol.

After distilling off alcohol, the soap formed by reaction of the fatty ester with the alkaline catalyst gels if too low a temperature is reached. The rate of saponification of methyl esters in methyl alcohol solution is low, so that there is relatively little tendency to gel when carrying out the alcoholysis with methyl alcohol, but this tendency increases with an increase in the molecular weight of the alcohol employed. The gelling temperature depends upon the amount of soap present, as well as upon the nature of the soap and upon the esters formed. The greater the amount of soap present, the higher is the gelling temperature, and soaps and esters of low molecular weight, as well as the more unsaturated materials, can be cooled to a lower temperature before gelling occurs than can like materials of higher molecular weight and greater saturation. Thus, in the case of tallow, a soap content of more than about 10% prevents satisfactory separation of a glycerine layer.

Before cooling the residue remaining after vaporization of the alcohol, it may be treated with a brine solution to salt out the soap or with acid to form free fatty acids, and the glycerine layer may be thereafter withdrawn, or, where the residue may be settled while still hot, the glycerine layer may be withdrawn and thereafter treated with brine or acid, as aforesaid. Glycerine may be removed from the soap-containing glycerine layer by heating in an inert atmosphere to a temperature above the melting point of the resulting anhydrous soap while passing steam or other inert gas therethrough, or by flash distillation.

In carrying out the alcoholysis, the temperature may be regulated as desired. In general, however, the fatty oil, alcohol and catalyst are preferably contacted at about room temperature, particularly when small amounts of water are present. The possibility of excessive local saponification of the resulting esters, thus removing the catalyst from the reaction body before the reactants have been thoroughly mixed, is thereby eliminated. For this reason, temperatures of above 60° C. are usually to be avoided at the start of the reaction. The reaction temperature may vary from about 40° C. to about 160° C. or higher, but below the temperature of substantial decomposition of the reactants. In methanolysis and ethanolysis, temperatures of about 90° C. to about 130° C. have been found to give satisfactory results.

In increasing the temperature to volatilize the alcohol, it is advantageous to carry out such volatilization above the temperature of substantial homogeneity but below the temperature of substantial reversal of the reaction upon removal of the alcohol. This temperature of substantial reversal varies somewhat, depending upon the character of the fatty acid radicals involved. In general, above about 160° C. to about 180° C., even in the absence of free alkali, the soap formed catalyzes the reversion of the alkyl esters to glycerides during the removal of excess alcohol. With coconut oil and oils having a mixture of glycerides of like molecular weight, temperatures below about 180° C. give satisfactory results, and, with most glycerides, a temperature of about 130° C. to about 160° C. has been found to provide rapid removal of the lower alcohols, especially at reduced pressures. In general, the operation may be carried out at reduced pressures, at atmospheric pressure or at superatmospheric pressures.

Similarly, in cooling the residue after volatilization of the alcohol, the temperature of homogeneity of the resulting mixture also varies with the character of the fatty acid radicals involved. Satisfactory separation of the glycerine layer has been achieved with coconut oil and like mixtures of glycerides at temperatures below about 130° C., and separation temperatures of about 90° C. to about 123° C. have been found to provide satisfactory separation of glycerine in the case of most glycerides.

The fatty material treated may be any fat or fatty oil suitable for employment by the soap-making art in any of the processes heretofore known or any other fatty glyceride or fatty acid ester of other polyhydric alcohols or of long chain monohydric alcohols or mixtures of these, especially those containing glycerides of fatty acids having about eight to about twenty-six, and preferably about twelve to about twenty, carbon atoms per molecule. These include coconut oil, palm oil, olive oil, cottonseed oil, corn oil, soya bean oil, tung oil, wool fat, tallow, whale and fish oils, etc.

In carrying out the alcoholysis according to this invention, short chain aliphatic alcohols, including aryl-substituted aliphatic alcohols, are preferably employed, particularly the saturated, primary alcohols, especially alcohols having a boiling point in the presence of water in excess of the azeotropic composition of lower than 100° C. at atmospheric pressure, and, more particularly, the lower alcohols having one to about six carbon atoms per molecule. Thus, alcohols satisfactory for use in forming esters with the fatty acid components of the glycerides treated include methyl alcohol, ethyl alcohol, propyl alcohol, isopropyl alcohol, n-butyl alcohol, isobutyl alcohol, tertiary butyl alcohol, the amyl alcohols, benzyl alcohol, etc. It is preferred to employ an amount of alcohol at least about twice the calculated theoretical amount necessary for alcoholysis of the particular glycerides treated, and particularly satisfactory results have been obtained when using an excess of at least three to five times the stoichiometric amount required.

It is also preferred to maintain substantially anhydrous conditions during the alcoholysis, since the presence of water tends to speed up the rate of saponification of the alkyl esters. However, in ethanolysis, as much as about 1% of water based on the weight of the alcohol may be present without appreciably affecting the yield of esters. In methanolysis, the rate of saponification of methyl esters in methyl alcohol is normally so low that the presence of even as much as 5% of water or higher may be tolerated.

Among the alkaline alcoholysis catalysts which have been found suitable for use in the present process are sodium hydroxide, sodium carbonate, sodium methylate, barium oxide, lime, etc. While it is possible to obtain good yields with proportions of catalysts up to about 0.30 mol per equivalent of fatty glycerides and higher, it is preferred to use large excesses of alcohol and to introduce relatively small amounts of catalyst, say of the order of about 0.03 mol to about 0.10 mol per equivalent of glycerides in order to reduce the amount of soap formed. A convenient way of introducing the catalyst into the reaction mixture is in admixture with and, where practical, advantageously in solution in the alcohol employed.

The process of the present invention will now be described with respect to certain embodiments. It will be understood that the following examples are merely illustrative and that this invention is not limited thereto.

*Example I*

About 215 parts by weight per minute of dry, refined coconut oil are passed into a contactor coil in confluence with about 130 parts per minute of methanol containing dry sodium hydroxide dissolved therein in the proportion of about 1 part by weight of sodium hydroxide to 64 parts of methanol. The contactor coil is of such dimensions that it contains about 5,000 parts by weight of material. The materials are turbulently mixed in the coil at about 40° C., and the mixture flows from the outlet of the coil into a volatilization chamber containing a series of indirect steam coils and maintained under an absolute pressure of about two inches of mercury. Steam is supplied to the steam coils at a gauge pressure of about 75 pounds per square inch, so that they are at a temperature of about 160° C. The reaction mixture, containing methyl esters of the coconut oil fatty acids and glycerine, with some of the glycerides only partially reacted, flows downwardly over the steam coils, and the excess alcohol is volatilized and is removed from the chamber, passing therefrom to a condenser and receivers. The esters and glycerine, substantially free of alcohol, are run into a separation chamber and are allowed to cool and to settle. The glycerine separates as a lower layer and is withdrawn, and the upper layer containing methyl esters and partially reacted glycerides overflows into an outlet in the upper part of the separation chamber. A portion of the upper layer is used as such without further treatment, and a second portion is subjected to vacuum distillation. The distillate of the second portion comprises the crude methyl esters of the coconut oil acids, and the distillation residue, comprising partially reacted glycerides, is returned to the inlet end of the contactor coil for retreatment.

*Example II*

Corn oil, refined and substantially anhydrous, is run into a homogenizer at the rate of about 295 parts per minute. Ethyl alcohol containing about 0.6% of sodium hydroxide is also run into the homogenizer at a rate of about 230 parts per minute. The materials are thoroughly mixed and are passed into a contactor coil of such dimensions that it contains about fifteen to about twenty minutes' run of materials. The coil is heated to a temperature of about 45° C., and the materials are delivered from the outlet end of the coil to a preheater wherein the temperature of the mixture is increased to about 140° C. The effluent from the preheater passes to a distillation column having a reboiler below the column where a temperature of about 150° C. is maintained. Excess alcohol is volatilized and is removed at the top of the column, and the hot residue containing ethyl esters of corn oil acids and glycerine is run through a cooling coil to reduce the temperature to about 115° C. The cooled reaction mixture is passed to a separation chamber, where it is allowed to settle. A glycerine layer is withdrawn at the bottom, and the esters are removed from the upper part of the chamber and treated as in Example I.

*Example III*

A mixture of about 285 parts by weight of tallow with about 215 parts of coconut oil is dried, heated to about 120° C. and pumped into a contactor coil at the rate of about 500 parts per minute. An ethyl alcohol solution containing about 3% of sodium hydroxide is prepared, and this solution is heated to about 80° C. and pumped into the contactor coil at a rate of about 190 parts per minute in confluence with the tallow and coconut oil. The coil is of such dimensions that it contains about ten minutes' run of the reaction mixture and is furnished with means for heating the contents thereof. The mixture is heated to about 150° C., is held at a pressure of about 150 pounds per square inch while in the coil and is then ejected through a nozzle into a flash chamber. The flash chamber is heated to about 150° C. and is maintained under an absolute pressure of about two inches of mercury. The excess ethyl alcohol is there volatilized and is removed from the chamber, and the reaction product comprising the ethyl esters of tallow and coconut oil fatty acids together with glycerine runs into a cooling coil, where its temperature is reduced to about 120° C. The cooled mixture is passed to a separation tank, where it is allowed to settle and is then separated and treated as in Example I.

The ester fractions obtained according to the present invention with or without washing and/or subsequent purification can be employed in many chemical processes and products, as in the paint, perfumery, lubricating oils, medicinals and other fields. They may be used for chemical reductions and in many chemical syntheses, and one of their greatest outlets for volume consumption is in the soap-making industry.

Although the present invention has been described with reference to particular embodiments and examples, it will be apparent to those skilled in the art that variations and modifications of this invention can be made and that equivalents can be substituted therefor without departing from the principles and true spirit of the invention.

We claim:

1. The process which comprises reacting a fatty glyceride with a low molecular weight monohydric alcohol in the presence of an alkaline alcoholysis catalyst to produce a liquid body containing esters of the alcohol with fatty acids from the glyceride, glycerine and unreacted alcohol; volatilizing the unreacted alcohol from said body at a temperature such that said liquid body remains homogeneous during volatilization; and thereafter separating the esters from the glycerine.

2. The process of claim 1 wherein the alcohol employed is an aliphatic alcohol having one to about six carbon atoms per molecule.

3. The process of claim 1 wherein the alcohol employed is a saturated aliphatic alcohol having one to about six carbon atoms per molecule.

4. A process for treating fatty glycerides which comprises reacting a fatty glyceride with a saturated, straight chain, monohydric alcohol having one to about six carbon atoms per molecule in the presence of an alkaline alcoholysis catalyst to produce a liquid body containing alkyl esters, glycerine and unreacted alcohol; distilling unreacted alcohol from said liquid body at a temperature such that said liquid body remains homogeneous during the distillation but below the temperature of substantial reversal of the reaction in the absence of alcohol to leave a residue containing alkyl esters and glycerine; and separating the alkyl esters from the glycerine.

5. A process for treating fatty glycerides which comprises reacting a fatty glyceride with a saturated, straight chain, monohydric alcohol having one to about six carbon atoms per molecule in the presence of an alkaline alcoholysis catalyst at a temperature sufficient to cause rapid alcoholysis, thereby producing a liquid body containing alkyl esters, glycerine and unreacted alcohol; distilling unreacted alcohol from said liquid body under reduced pressure and at a temperature at which said liquid body remains homogeneous during said distillation but below the temperature of substantial reversal of the reaction in the absence of alcohol to leave a residue containing alkyl esters and glycerine; and separating the alkyl esters from the glycerine at a temperature below the temperature of homogeneity of the residue in the absence of alcohol.

6. A process for preparing methyl esters which comprises reacting fatty glycerides with methyl alcohol in the presence of an alkaline alcoholysis catalyst and at a temperature up to about 130° C. to produce a liquid body containing methyl esters, glycerine and unreacted alcohol; volatilizing unreacted alcohol from said liquid body at an increased temperature at which the liquid body remains homogeneous during said volatilizing but below the temperature of substantial reversal of the reaction in the absence of alcohol; settling the residue at a temperature below the temperature of homogeneity but above the temperature of gelatinization, whereby two liquid phases are formed; and separating the phase containing methyl esters from the phase containing glycerine.

7. A process for preparing ethyl esters which comprises reacting fatty glycerides with ethyl alcohol in the presence of an alkaline alcoholysis catalyst and at a temperature up to about 130° C. to produce a liquid body containing ethyl esters, glycerine and unreacted alcohol; volatilizing unreacted alcohol from said body at an increased temperature at which the liquid body remains homogeneous during said volatilizing but below the temperature of substantial reversal of the reaction in the absence of alcohol; cooling the residue to a temperature below the temperature of homogeneity of said residue but above the temperature of gelatinization, whereby two liquid phases are formed; and separating the phase containing ethyl esters from the phase containing glycerine.

8. A process for preparing alkyl esters which comprises reacting a fatty glycerine with a saturated aliphatic monohydric alcohol having one to about six carbon atoms per molecule in the presence of an alkaline alcoholysis catalyst and at a temperature sufficient to cause rapid alcoholysis, whereby a liquid body containing alkyl esters, glycerine and unreacted alcohol is produced; volatilizing unreacted alcohol therefrom by flashing said liquid body into a reduced pressure zone at a temperature such that said liquid body remains homogeneous during said volatilizing but below the temperature of substantial reversal of the reaction in the absence of alcohol; and separating the residue at a temperature below the temperature of homogeneity of said residue but above the temperature of gelatinization.

9. A process for preparing methyl esters which comprises reacting a fatty glyceride with methyl alcohol in the presence of an alkaline alcoholysis catalyst and at a temperature of about 90° C. to about 130° C., whereby a liquid body containing methyl esters, glycerine and unreacted alcohol is produced; volatilizing unreacted alcohol from said liquid body at a temperature of about 130° C. to about 160° C.; cooling the residue to a temperature of about 90° C. to about 123° C., whereby two liquid phases are formed; and separating the phase containing methyl esters from the phase containing glycerine.

10. A process for preparing ethyl esters which comprises reacting a fatty glyceride with ethyl alcohol in the presence of an alkaline alcoholysis catalyst and at a temperature of about 90° C. to about 130° C., whereby a liquid body containing ethyl esters, glycerine and unreacted alcohol is produced; volatilizing unreacted alcohol from said liquid body at a temperature of about 130° C. to about 160° C.; cooling the residue to a temperature of about 90° C. to about 123° C., whereby two liquid phases are formed; and separating the phase containing ethyl esters from the phase containing glycerine.

11. A process for preparing alkyl esters which comprises reacting a fatty glyceride with a saturated, straight chain, monohydric alcohol having one to about six carbon atoms per molecule in the presence of an alkaline alcoholysis catalyst to produce a liquid body containing alkyl esters, glycerine and unreacted alcohol; volatilizing unreacted alcohol from said liquid body at a temperature such that said liquid body remains homogeneous but below the temperature of substantial reversal of the reaction in the absence of alcohol; acidifying the residue of the liquid body with an acid stronger than the fatty acid of the glyceride to provide an upper layer containing alkyl esters and a lower layer containing glycerine; and separating the upper layer from the lower layer.

12. A process for preparing methyl esters which comprises reacting a fatty glyceride with methyl alcohol in the presence of an alkaline alcoholysis catalyst at a temperature sufficient to cause rapid alcoholysis, whereby a liquid body containing methyl esters, glycerine and unreacted alcohol is produced; volatilizing unreacted alcohol from said liquid body at a temperature of about 130° C. to about 160° C.; acidifying the residue of said liquid body with a mineral acid to provide an upper layer containing methyl esters and a lower layer containing glycerine; and separating said layers.

13. A process for preparing ethyl esters which comprises reacting a fatty glyceride with ethyl alcohol in the presence of an alkaline alcoholysis catalyst at a temperature sufficient to cause rapid alcoholysis, whereby a liquid body containing ethyl esters, glycerine and unreacted alcohol is produced; vaporizing unreacted alcohol from said liquid body at a temperature of about 130° C. to about 160° C.; acidifying the residue of said liquid body with a mineral acid to provide an upper layer containing ethyl esters and a lower layer containing glycerine; and separating said layers.

14. In the process for preparing alkyl esters comprising reacting a fatty glyceride with a low molecular weight monohydric alcohol in the presence of an alkaline alcoholysis catalyst to form a liquid body containing esters of the alcohol with fatty acids from the glyceride, glycerine and unreacted alcohol, and separately recovering said esters and glycerine from said liquid body, the improvement which comprises volatilizing unreacted alcohol from said liquid body at a temperature such that said liquid body remains homogeneous during said volatilizing but below the temperature of substantial reversal of the reaction in the absence of alcohol to leave a residue containing said esters and glycerine.

15. In the process for preparing alkyl esters comprising reacting a fatty glyceride with a saturated, straight chain, monohydric alcohol having one to about six carbon atoms per molecule in the presence of an alkaline alcoholysis catalyst and at a temperature sufficent to cause rapid alcoholysis to form a liquid body containing alkyl esters, glycerine and unreacted alcohol, and separately recovering alkyl esters and glycerine from said liquid body, the improvement which comprises volatilizing unreacted alcohol from the liquid body at a temperature such that said liquid body remains homogeneous during said volatilizing but below the temperature of substantial reversal of the reaction in the absence of alcohol, and permitting the residue containing alkyl esters and glycerine to settle at a temperature below the temperature of homogeneity of said residue in the absence of alcohol, whereby two liquid phases are formed.

16. In the process for preparing methyl esters comprising reacting a fatty glyceride with methyl alcohol in the presence of an alkaline alcoholysis catalyst to form a liquid body containing methyl esters, glycerine and unreacted alcohol, and separately recovering methyl esters and glycerine from said liquid body, the improvement which comprises volatilizing methyl alcohol from said liquid body at a temperature of about 130° C. to about 160° C., and cooling the residue containing methyl esters and glycerine to a temperature of about 90° C. to about 123° C. before separately recovering the methyl esters and glycerine.

17. In the process for preparing ethyl esters comprising reacting a fatty glyceride with ethyl alcohol in the presence of an alkaline alcoholysis catalyst to form a liquid body containing ethyl esters, glycerine and unreacted alcohol, and separately recovering ethyl esters and glycerine from said liquid body, the improvement which comprises volatilizing ethyl alcohol from said liquid body at a temperature of about 130° C. to about 160° C., and cooling the residue containing ethyl esters and glycerine to a temperature of about 90° C. to about 123° C. before separately recovering the ethyl esters and glycerine.

GERALD INMAN KEIM.
JOHN ROSS.